United States Patent
Mukherji (10) Patent No.: US 9,682,340 B2
(45) Date of Patent: Jun. 20, 2017

(54) SYSTEMS AND METHODS FOR REMOVING PARTICULATE MATTER FROM EXHAUST GAS STREAMS

(71) Applicant: Sidel Systems USA Inc., Atascadero, CA (US)

(72) Inventor: Parthosarothy K. Mukherji, Pune (IN)

(73) Assignee: Sidel Systems USA Inc., Atascadero, CA (US)

( * ) Notice: Subject to any disclaimer, the term of this patent is extended or adjusted under 35 U.S.C. 154(b) by 8 days.

(21) Appl. No.: 14/633,001

(22) Filed: Feb. 26, 2015

(65) Prior Publication Data
US 2015/0251121 A1    Sep. 10, 2015

Related U.S. Application Data

(60) Provisional application No. 61/949,278, filed on Mar. 7, 2014.

(51) Int. Cl.
| | | |
|---|---|---|
| *B01D 29/25* | (2006.01) | |
| *B01D 46/12* | (2006.01) | |
| *B01D 46/00* | (2006.01) | |
| *B01D 46/24* | (2006.01) | |

(52) U.S. Cl.
CPC ..... *B01D 46/0065* (2013.01); *B01D 46/0056* (2013.01); *B01D 46/0067* (2013.01); *B01D 46/24* (2013.01)

(58) Field of Classification Search
CPC  B01D 11/0269; B01D 46/0075; B01D 29/25; B01D 46/12; B01D 46/0065; B01D 46/0093; B01D 46/521; B01D 46/2411
USPC .... 55/289, 283, 301, 290, 299, 304; 96/408; 209/386; 299/12
See application file for complete search history.

(56) References Cited

U.S. PATENT DOCUMENTS

| | | | | |
|---|---|---|---|---|
| 2,500,056 | A * | 3/1950 | Barr | B01D 11/0269 134/10 |
| 4,266,829 | A * | 5/1981 | Divers | E21F 5/20 299/12 |
| 4,661,129 | A * | 4/1987 | Nederman | B01D 46/0075 55/283 |
| 4,983,290 | A * | 1/1991 | Schumann | B01D 29/25 209/386 |
| 5,183,487 | A * | 2/1993 | Lodico | F01P 11/12 55/289 |

(Continued)

*Primary Examiner* — Jacob T Minskey
*Assistant Examiner* — Min-Chau Pham
(74) *Attorney, Agent, or Firm* — Doherty IP Law Group LLC (57) ABSTRACT

A system for removing particulate matter from an exhaust gas includes a housing having an inlet, an outlet, and a drum region between the inlet and the outlet. A drum is rotatably mounted in the drum region of the housing and is aligned with the inlet and the outlet for intercepting the exhaust gas stream passing through the housing. The drum has a cylindrical shaped screen that allows the exhaust gas stream to pass through the drum while collecting the particulate matter present in the exhaust gas stream. As the screen rotates, a scraper removes the particulate matter collected on the screen. A spray fixture located inside the drum sprays fluid at the inner surface of the screen to removes any particulate matter remaining on the screen after the outer surface of the screen has been scraped.

20 Claims, 10 Drawing Sheets

(56) References Cited

U.S. PATENT DOCUMENTS 5,573,563 A * 11/1996 Odom ................... B01D 46/12
                                                              55/301
8,097,050 B2 * 1/2012 Johnson ............. B01D 46/0065
                                                           460/102

* cited by examiner

SYSTEMS AND METHODS FOR REMOVING PARTICULATE MATTER FROM EXHAUST GAS STREAMS

CROSS-REFERENCE TO RELATED APPLICATIONS

The present patent application claims benefit of U.S. Provisional Application No. 61/949,278, filed Mar. 7, 2014, the disclosure of which is hereby incorporated by reference herein.

BACKGROUND OF THE INVENTION

Field of the Invention

The present invention is generally directed to treating exhaust gas streams and is more particularly directed to systems and methods for removing particulate matter from exhaust gas streams.

Description of the Related Art

An electrostatic precipitator (ESP) is a large, industrial emission-control unit. An ESP is designed to trap and remove dust particles from the exhaust gas stream of an industrial process. ESPs are used in a wide variety of industries including power/electric generation, cement manufacturing, chemical manufacturing, metal manufacturing, and paper production.

In many industrial plants, particulate matter created in the industrial process is carried as dust in the hot exhaust gases. These dust-laden gases pass through an ESP that collects most of the dust. Cleaned exhaust gas then passes out of the precipitator and through a stack to the atmosphere. Electrostatic precipitators typically collect 99.9% or more of the dust from the exhaust gas stream.

ESPs operate by electrostatically charging the dust particles in the exhaust gas stream. The charged particles are then attracted to and deposited on plates or other collection devices. When enough dust has accumulated, the collectors are shaken to dislodge the dust, causing it to fall with the force of gravity to hoppers below. The dust is then removed by a conveyor system for disposal or recycling.

Depending upon dust characteristics and the gas volume to be treated, there are many different sizes, types and designs of electrostatic precipitators. Very large power plants may have multiple electrostatic precipitators for each unit.

During electrostatic precipitation, six activities typically take place: 1) Ionization—Charging of particles; 2) Migration—Transporting the charged particles to the collecting surfaces; 3) Collection—Precipitation of the charged particles onto the collecting surfaces; 4) Charge Dissipation—Neutralizing the charged particles on the collecting surfaces; 5) Particle Dislodging—Removing the particles from the collecting surface to the hopper; and 6) Particle Removal—Conveying the particles from the hopper to a disposal point The major ESP components that accomplish these activities include Discharge Electrodes; Power Components; Precipitator Controls; Rapping Systems; Purge Air Systems; and Flue Gas Conditioning The complexity of ESP and the requirement for a large number of components makes the ESP process complicated and unreliable. Thus, there is a need for a simpler, more effective and more economical system for removing particles from an exhaust gas stream.

Thus, there remains a need for improved systems for removing particulate matter from exhaust gas streams.

SUMMARY OF THE INVENTION

In one embodiment, a system for removing particulate matter from an exhaust gas stream preferably includes a housing having an inlet, an outlet, and a drum region located between the inlet and the outlet. A drum is rotatably mounted in the drum region of the housing and is aligned with the inlet and the outlet for intercepting an exhaust gas stream passing through the housing. In one embodiment, the drum has a cylindrical shaped screen that allows the exhaust gas stream to pass through the drum while collecting particulate matter present in the exhaust gas stream on an outer surface of the screen. A motor preferably rotates the drum as the exhaust gas stream passes through the housing. The system desirably has a scraper adjacent the screen for removing the particulate matter collected on the screen. A spray fixture is preferably located inside the drum. The spray fixture desirably has spray nozzles that face an inner surface of the screen for spraying fluid at the inner surface of the screen for removing any particulate matter remaining on the screen after the outer surface of the screen has been scraped.

In one embodiment, the system desirably includes a stop flange extending from a roof of the housing and toward the drum for directing the flow of the exhaust gas stream through the drum so that the exhaust gas stream cannot flow between the drum and the roof of the housing.

In one embodiment, the drum region of the housing preferably defines the largest cross-sectional area of the housing. The housing desirably tapers outwardly between the inlet and a leading end of the drum region, and the housing desirably tapers inwardly between the trailing end of the drum region and the outlet.

In one embodiment, the drum region of the housing preferably has a lower end including a tapered lower section that collects the particulate matter scraped off the screen by the scraper and removed from the screen by the spray fixture. The system may include an auger coupled with the tapered lower section of the housing for transporting the separated particulate matter toward a waste receptacle.

In one embodiment, the rotatable drum preferably has a first end plate having a first shaft, and a second end plate having a second shaft, whereby the first plate opposes the second plate and the first and second shafts are aligned with one another along a common axis. The drum preferably includes a plurality of stabilizing rods extending between the first and second plates for interconnecting the first and second plates. The cylindrical shaped screen is desirably wrapped around the stabilizing rods and extends between the first and second end plates. In one embodiment, the drum and the cylindrical shaped screen are made of stainless steel.

In one embodiment, the cylindrical shaped screen has an outer screen layer and an inner screen layer. The outer screen layer may have a twild weave and the inner screen layer may have a plain weave. The outer and inner screen layers may have a 250 mesh.

In one embodiment, a system for removing particulate matter from an exhaust gas stream desirably includes a housing having an inlet for receiving an exhaust gas stream, an outlet for discharging the exhaust gas stream after particulate matter has been removed therefrom, and a drum region located between the inlet and the outlet. The system preferably includes a rotatable drum mounted within the drum region of the housing for intercepting the exhaust gas stream as the exhaust gas stream passes through the housing.

In one embodiment, the rotatable drum desirably has a cylindrical shaped screen that allows the exhaust gas stream to pass through the rotatable drum as the rotatable drum rotates, whereupon the cylindrical shaped screen blocks and collects the particulate matter present in the exhaust gas stream on an outer surface of the cylindrical shaped screen. A motor may be coupled with the rotatable drum for selectively rotating the rotatable drum. The system preferably includes a particulate matter scraper disposed inside the housing and located adjacent the outer surface of the cylindrical shaped screen for removing the particulate matter from the cylindrical shaped screen as the rotatable drum is rotated by the motor. A spray fixture is preferably located inside the rotatable drum. The spray fixture may have spray nozzles spaced along the length thereof for dispensing a fluid. The spray nozzles preferably face an inner surface of the cylindrical shaped screen for spraying the fluid at the inner surface of the cylindrical shaped screen for removing the particulate matter remaining on the cylindrical shaped screen.

In one embodiment, as the exhaust gas stream passes through the cylindrical shaped screen of the rotatable drum, the particulate matter in the exhaust gas stream is collected by the cylindrical shaped screen so that the exhaust gas stream discharged from the outlet has less particulate matter than the exhaust gas stream entering the inlet.

In one embodiment, the system preferably has a control system coupled with the motor for controlling the rotation speed of the rotatable drum. In one embodiment, the system has a control system coupled with the spray fixture for controlling the volume of the fluid sprayed by the spray fixture.

In one embodiment, a method of removing particulate matter from an exhaust gas stream may include providing a housing having an inlet, an outlet, and a drum region located between the inlet and the outlet, and mounting a drum within the drum region of the housing, the drum having a screen adapted to collect particulate matter present in the exhaust gas stream. The method includes while rotating the drum, directing the exhaust gas stream into the inlet so that the exhaust gas stream passes through the screen and the drum, collecting the particulate matter in the exhaust gas stream on an outer surface of the screen, scraping the collected particulate matter from the outer surface of the screen, and after scraping, spraying fluid at an inner surface of the screen to dislodge any of the particulate matter remaining on the screen.

The method may include transporting the scraped and dislodged particulate matter to a waste receptacle.

In one embodiment, the screen is a cylindrical shaped screen having an outer screen layer and an inner screen layer. In one embodiment, the scraping step preferably includes providing a particulate matter scraper inside the housing for engaging the particulate matter collected on the outer surface of the screen, and the spraying fluid step desirably includes spaying water under high pressure at the inner surface of the screen to dislodge the particulate matter remaining on the outer surface of the screen after the scraping step.

The present application discloses a particulate recovery system that is simpler, more efficient, and more economical than ESPs. In particular, there is no ionization charging of particles, no migration transporting the charges part to collecting surface, and no charge decapitation, but rather a simple three step process of separating particles from an exhaust gas stream and removing the particles via a discharge hopper and into receiving receptacles.

ESPs have discharge electrodes, complicated power components, complicated controller systems, rapping systems, flue gas conditioning systems, require an inventory of expensive spare parts, and frequent replacement of components. The system disclosed herein has none of the above, has less moving parts, requires fewer spare parts, has a longer cycle between spare part replacement, has a simpler design, is more dependable in functioning, and has same separation\collection efficiency as most advanced ESP's at lesser capital, maintenance and operating costs.

The performance of ESPs varies greatly depending upon the size and type of particles in the exhaust gas. For example, particles from coal dust and from agro waste fuel will result in different performance efficiencies for ESPs. In contrast, the system disclosed herein is only dependent on flue gas volume and delivers the same performance efficiency irrespective of the type of fuel and type of particles.

With ESPs, if the gas flow rate varies, the performance suffers significantly at lower gas velocity. The system disclosed herein operates at the same efficiency regardless of gas flow.

In ESP efficiency of performance is optimum when the particle size is coarse. If there are too many small particles, the generation of an ESP charging field may be suppressed. The system disclosed herein is not affected by particle size.

Moreover, gas temperature affects the performance of ESP collecting efficiency. Such is not the case with the system disclosed herein.

In one embodiment, the particulate recovery system preferably includes an external modular housing constructed of sheet metal fabrication with inlet and outlet flanges for duct collection. Below the housing are hoppers from which ash and other collected material is discharged. The hoppers are desirably connected with rotary air lock valve system to prevent ingress of air into the collector. Within the housing, instead of flat plates, rappers, or electrodes, there is a rotatable drum which can have variable movement and speed and displacement depending upon volume of flue gas flow and therefore a self adjusting to any volume of flow or type of incoming particles of any size or distribution. The rotatable drum has a screen that collects particulate matter and the system is self-cleaning and powered by an external, easily accessible drive system (e.g., an electric motor). The collected particles may be discharged partially wet to prevent discharged matter from being scattered by wind and also to make it easy for collection. The control and monitoring systems are pre-programmed and configured for automatic or manual operation. Data is continuously streamed in real time to a website and/or hand held devices regarding collection, gas flow, power consumption, etc. All constructed materials are preferably corrosion resistant (e.g., stainless steel) to guarantee durability. Suitable access routes, platforms ladders, gang ways, and railings are provided for easy access and maintenance purposes. The entire assembly may be shipped/transported as a fully assembled package, with only minimum work on site required.

In contrast to ESP systems, the particulate recovery system disclosed herein is simpler, more reliable, provides greater economies of capital and running costs, and does not require special maintenance and support.

These and other preferred embodiments of the present invention will be described in more detail below.

DETAILED DESCRIPTION

Figure 1:
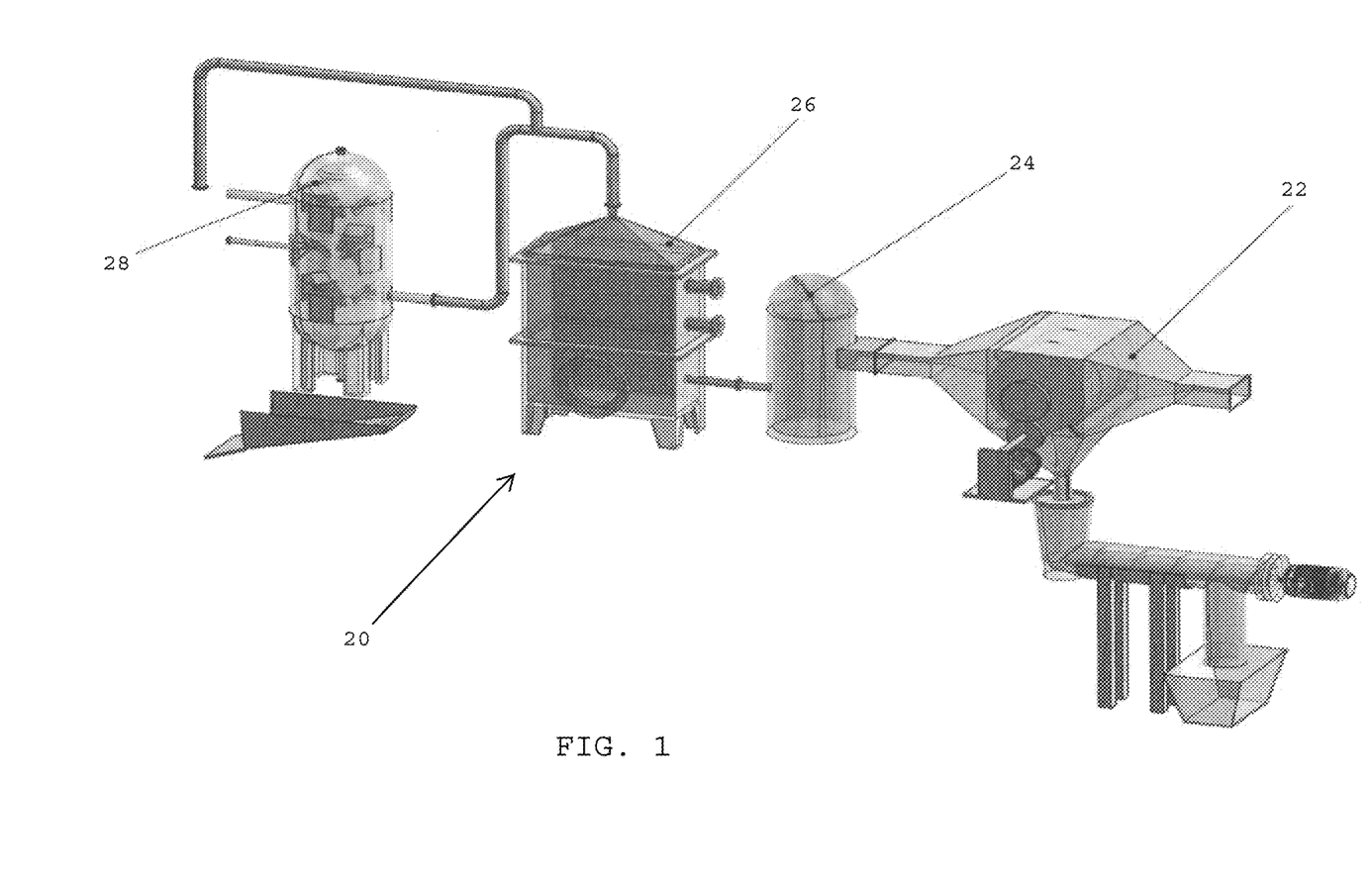
FIG. 1 shows a perspective view of an exhaust gas treatment system including a particulate recovery system having a drum enclosure, a rotating drum, a particulate scraper, and a spray fixture, in accordance with one embodiment of the present invention.

Referring to FIG. 1, in one embodiment, an exhaust gas treatment system 20 is preferably adapted to receive and treat exhaust gases from a power plant such as a coal burning power plant that produces electricity. In one embodiment, the exhaust gas treatment system 20 preferably includes a particulate recovery system 22 that removes particulate material (e.g., ash) from an exhaust gas, a sulfur gas recovery unit 24 that removes sulfur from the exhaust gas, a heat recovery unit 26 that removes heat energy from the exhaust gas, and a carbon capture unit 28 that remove carbon dioxide from the exhaust gas.

In one embodiment, the particulate recovery system 22 preferably includes a drum enclosure 30 having an inlet 32 that receives the exhaust gas of a power plant, an outlet 34 that discharges the exhaust gas from the drum enclosure after particulate matter has been removed from the exhaust gas, and a drum region 36 that contains a rotating drum 38 located between the inlet 32 and the outlet 34.

In one embodiment, the particulate recovery system 22 preferably includes a drum motor 40 that is linked to the rotating drum 38 via gears 42, 44. The rotating drum 38 is rotatably mounted inside the drum region 36 and is adapted to rotate about an axis that extends along the longitudinal axis of the rotating drum. In one embodiment, the drum motor 40 is activated for rotating the rotating drum 38 about a longitudinal axis in a clockwise direction designated $R_1$.

In one embodiment, the particulate recovery system 22 preferably includes a particulate scraper 45 that is disposed inside the drum enclosure 30 for scraping particulate matter that has been collected by the rotating drum 38. As the particulate matter is scraped from the outer surface of the rotating drum 38, the dislodged particulate matter falls toward the bottom of the drum enclosure 30 due to gravitational forces.

In one embodiment, the drum enclosure 30 of the particulate recovery system 22 preferably includes a tapered lower section 46 that tapers inwardly for collecting the particulate material that is removed from the rotating drum 38. Using gravity, the collected particulate material falls into the proximal end of an auger 48 having an auger motor 50. Upon activation of the auger motor 50, the collected particulate material is advanced toward the distal end of the auger for being collected in a particulate material collection receptacle 52 such as a dumpster, a dump truck, or a garbage truck.

Referring to FIGS. 3A-3D, in one embodiment, the drum enclosure 30 preferably includes the inlet 32, the outlet 34, and the drum region 36 located between the inlet and the outlet. The drum region 36 includes opposing side walls 54, 56 having respective aligned openings 58A, 58B that are adapted to receive a drum shaft (not shown) that enables the rotating drum 38 (FIG. 2) to rotate about its longitudinal axis. The drum enclosure 30 preferably includes the tapered lower section 46 that is in communication with a lower end of the drum region 36.

Figure 3A:
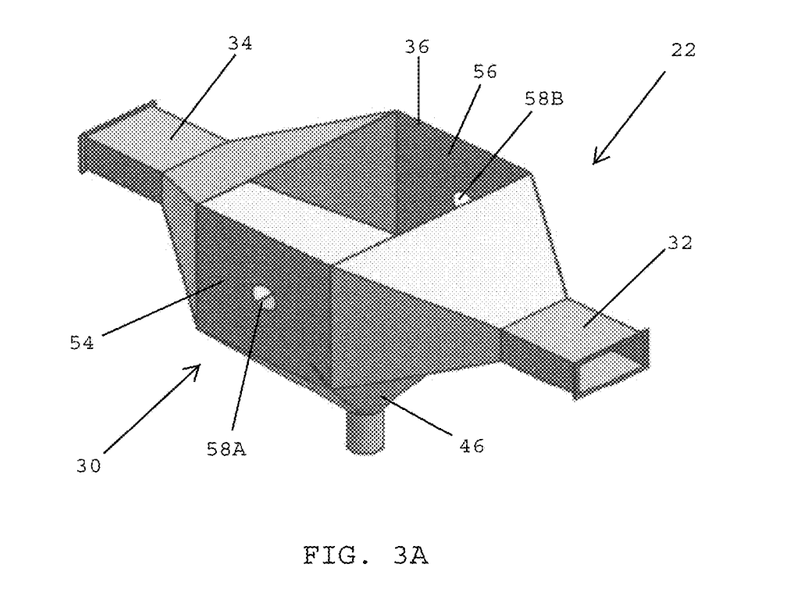
FIGS. 3A-3D show the drum enclosure of the particulate recovery system of FIG. 2, in accordance with one embodiment of the present invention.
Figure 3B:
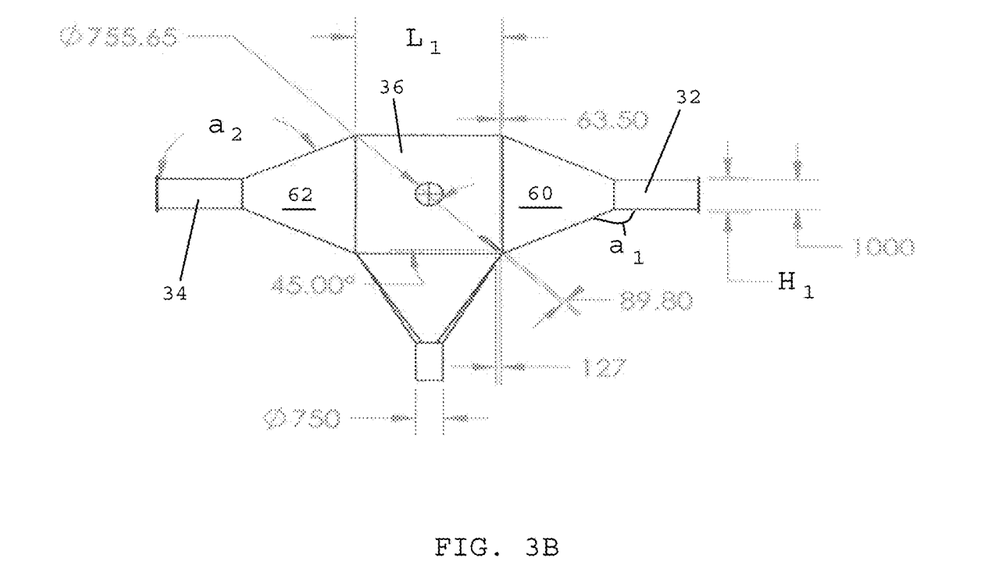
Figure 3C:
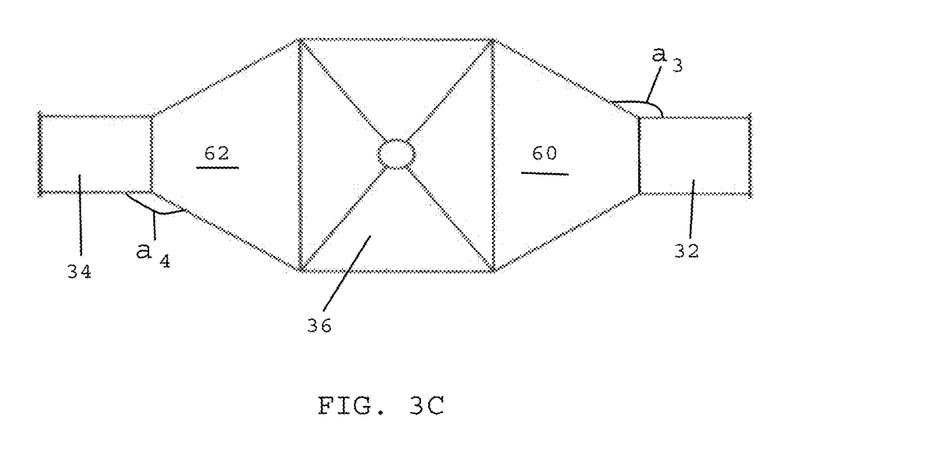

Referring to FIGS. 3B and 3C, the drum enclosure 30 preferably includes a tapered inlet section 60 that tapers outwardly between the inlet 32 and a leading end of the drum region 36, and a tapered outlet section 62 that tapers inwardly between a trailing end of the drum region 36 and the outlet 34. In one embodiment, the drum region 36 preferably defines the largest diameter section of the drum enclosure 30 and the respective diameters of the inlet 32 and the outlet 34 are smaller than the diameter of the drum region 36.

Referring to FIG. 3B, in one embodiment, the drum region 36 of the drum enclosure 30 has a length $L_1$ of about 4,000 cm and the inlet 32 has a height $H_1$ of about 1,200 cm. When viewed from the side, the inlet section 60 of the drum enclosure 30 preferably tapers outwardly at an angle $\alpha 1$ of about 140-160 degrees, and the outlet section of the drum enclosure 30 preferably tapers inwardly at an angle $\alpha 2$ of about 140-160 degrees.

Referring to FIG. 3C, in one embodiment, when viewed from the top, the inlet section 60 of the drum enclosure 30 preferably tapers outwardly at an angle $\alpha 3$ of about 140-150 degrees, and the outlet section 62 preferably tapers inwardly at an angle $\alpha 4$ of about 140-150 degrees.

Figure 2:
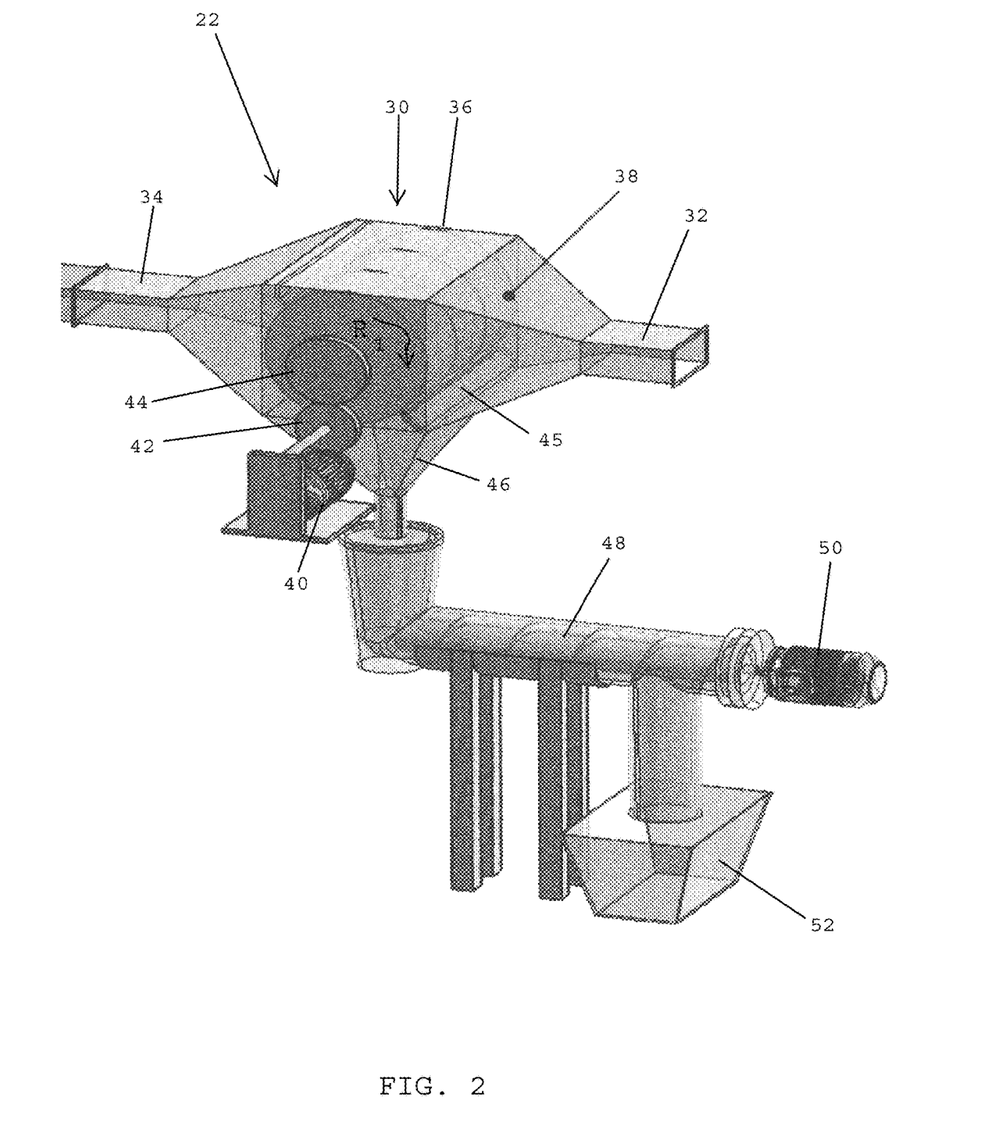
FIG. 2 shows a perspective view of the particulate recovery system of FIG. 1.
Figure 3D:
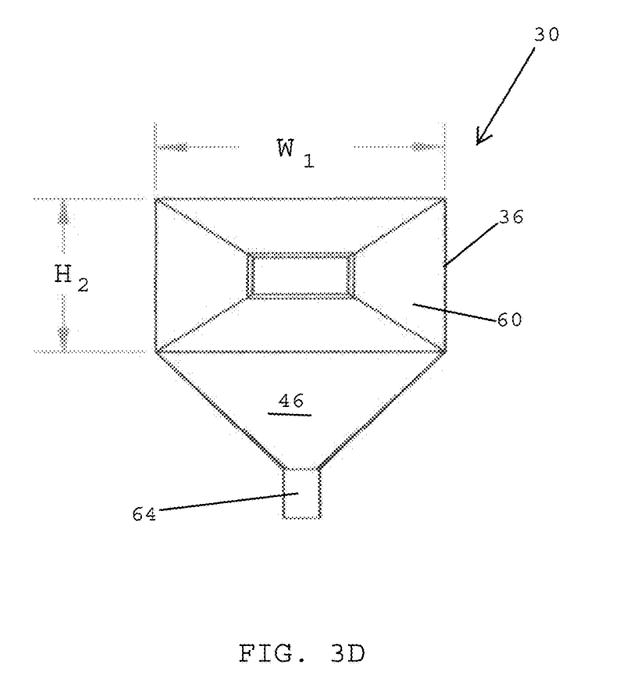

Referring to FIG. 3D, in one embodiment, the drum region 36 of the drum enclosure 30 preferably has a height $H_2$ of about 4,000 cm and a width $W_1$ of about 6,000 cm. The inlet section 60 tapers outwardly to match both the height and the width of the drum region 36. The lower end of the drum region 36 preferably includes the tapered lower section 46 that collects the particulate matter that is removed from the rotating drum 38 (FIG. 2). The drum enclosure 30 desirably includes a discharge conduit 64 for transferring the collected particulate matter from the drum enclosure to the auger 48 (FIG. 2).

Figure 4A:
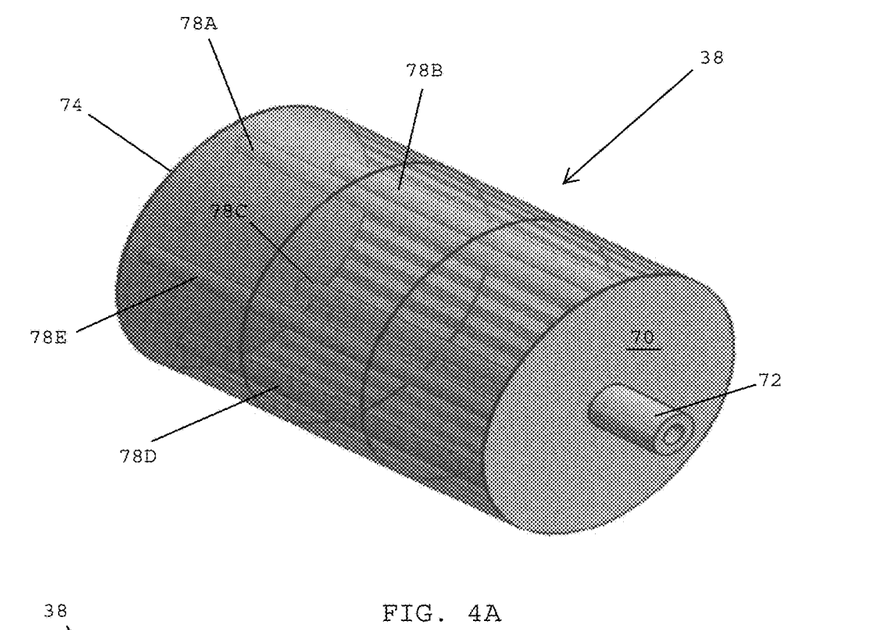
FIGS. 4A-4C show the rotating drum of the particulate recovery system of FIG. 2, in accordance with one embodiment of the present invention.
Figure 4B:
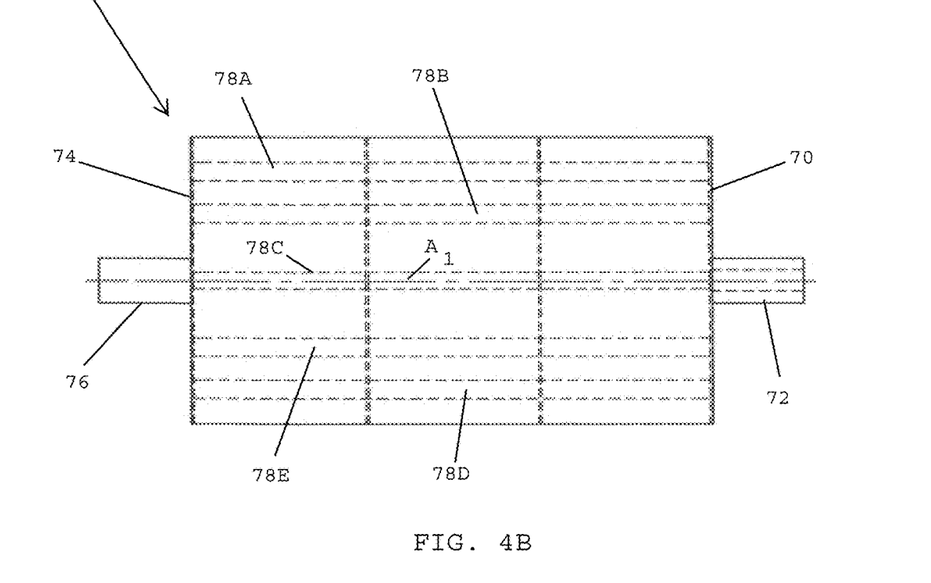
Figure 4C:
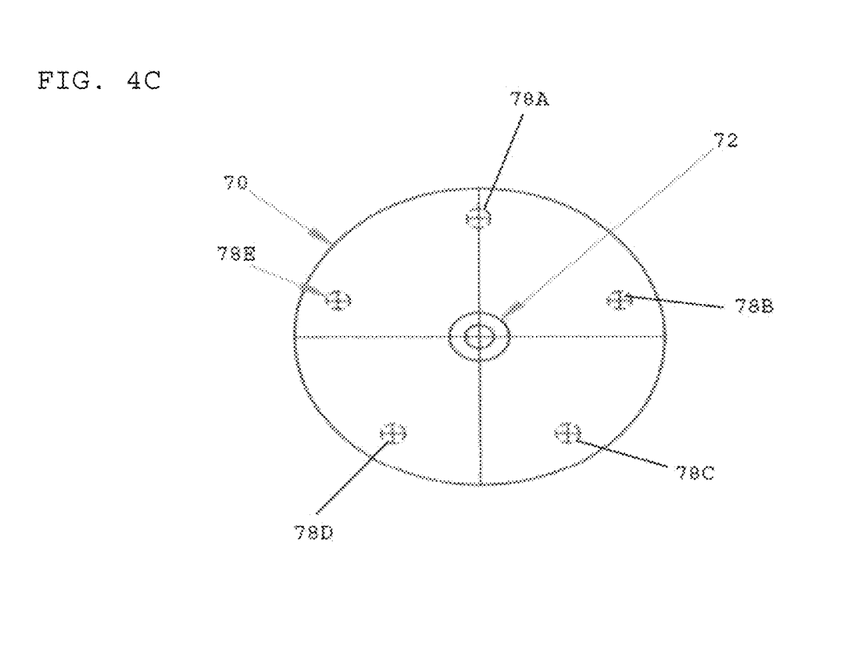

Referring to FIGS. 4A-4C, in one embodiment, the rotating drum 38 preferably includes a first plate 70 having a first shaft 72, and an opposing second plate 74 having a second shaft. The first and second shafts 72, 76 preferably extend along a longitudinal axis $A_1$. When the rotating drum 38 is mounted inside the drum enclosure 30 (FIG. 2), the rotating shaft is designed to rotate about the longitudinal axis A1.

In one embodiment, the rotating drum 38 preferably has stabilization rods 78A-78E that extend between the first and second plates 70, 74 for stabilizing and providing rigidity to the rotating drum structure.

Referring to FIG. 4A, in one embodiment, the rotating drum 38 desirably has at least one layer of a screen 80 wrapped around the outer surface of the drum and extending between the outer perimeters of the respective first and second plates 70, 74. In one preferred embodiment, the rotating drum 38 preferably has two layers of screen wrapped around the outer surface of the drum and extending between the outer perimeters of the respective first and second plates. In one embodiment, the first screen layer is a 250 mesh screen designated T304 stainless steel, twild weave sold by Screen Tech Group, and the second screen layer is 250 mesh screen designated T304 stainless steel, plain weave sold by Screen Tech Group.

Figure 5:
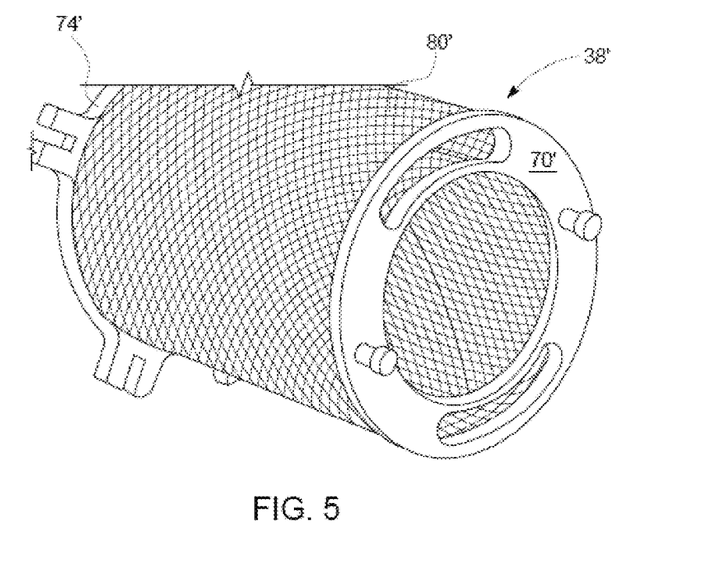
FIG. 5 shows a perspective view of a rotating drum of a particulate recovery system, in accordance with one embodiment of the present invention.

Referring to FIG. 5, in one embodiment, a rotating drum 38' has a double layer screen 80' wrapped around the outer perimeter of the rotating drum 38' and extending between the outer perimeters of the first and second plates 70', 74'. The rotating drum 38' is preferably placed in the exhaust gas stream of a power plant for collecting the particulate matter present in the exhaust gas. The double layer screen 80' preferably captures the particulate matter for collection as described in more detail herein.

Figure 6A:
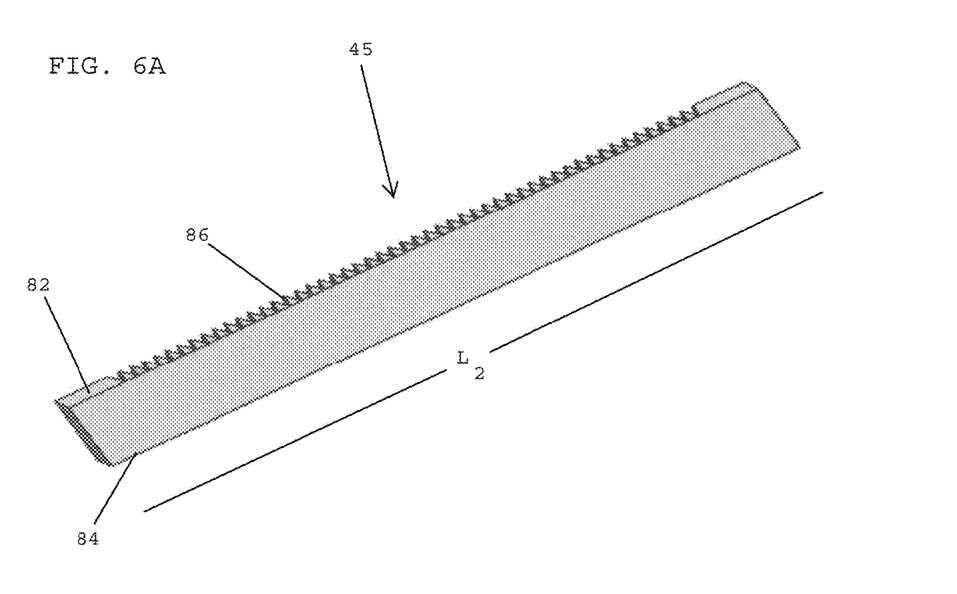
FIGS. 6A-6D show the particulate scraper of the particulate recovery system of FIG. 2, in accordance with one embodiment of the present invention.
Figure 6B:
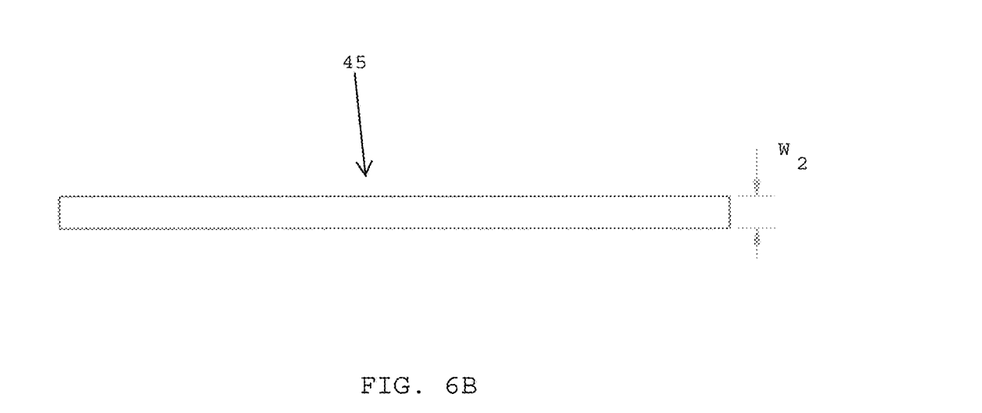

Referring to FIG. 6A, in one embodiment, the scraper 45 has a leading edge 82, a trailing edge 84, and a plurality of teeth 86 located at the leading edge and extending along the length $L_2$ of the scraper 45. Referring to FIG. 6B, in one embodiment, the scraper 45 has a width $W_2$ of about 350-400 cm and more preferably about 386 cm.

Figure 6C:
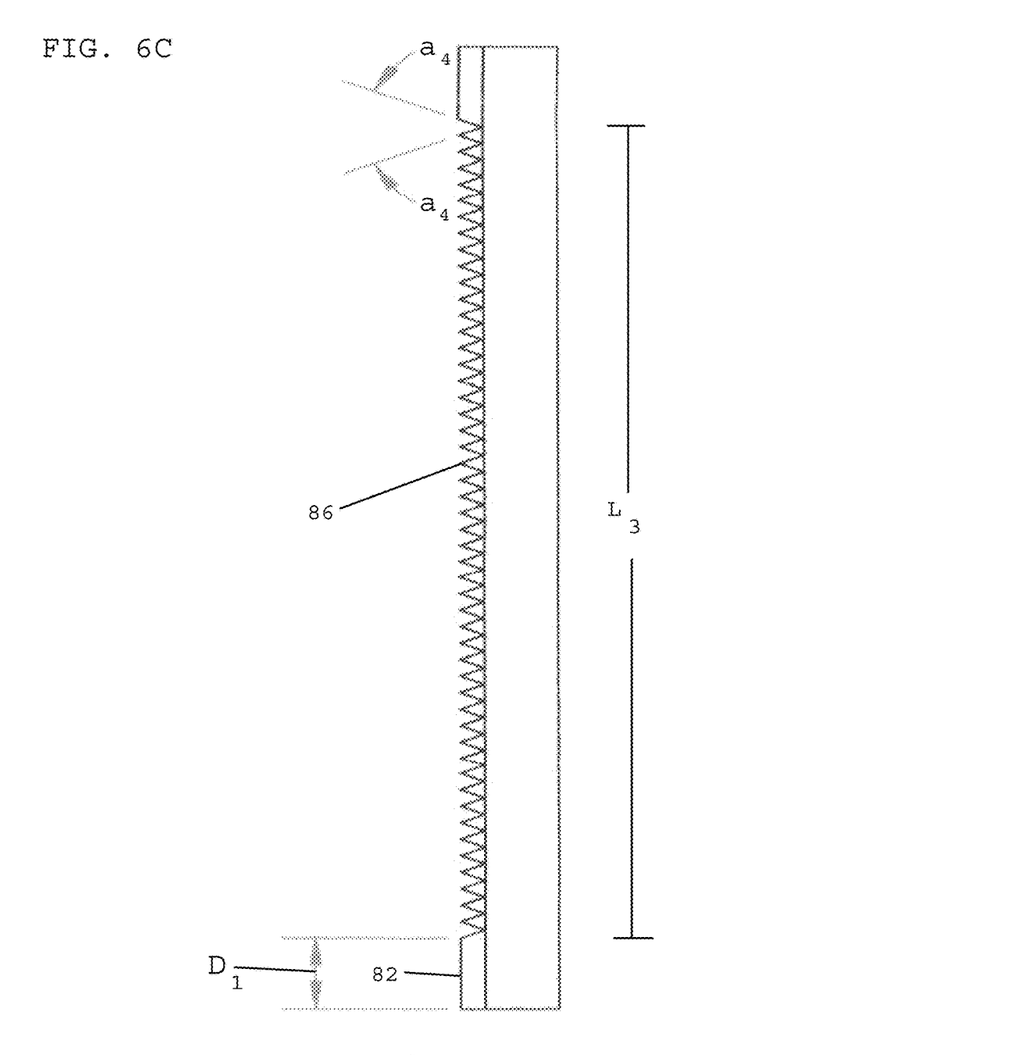

Referring to FIG. 6C, in one embodiment, the plurality of teeth 86 are centered along the leading edge 82 and are spaced inwardly from the ends of the scraper by a distance D1 of about 472.50 cm. The teeth 86 extend a length $L_3$ of about 5,300-5,400 cm along the leading edge 82 of the scraper. The depth of cut for each tooth 86 is preferably 120-130 cm and more preferably about 127 cm. The tapered cut between each tooth 86 defines an angle $\alpha 4$ of about 45 degrees. In one embodiment, each tooth 86 preferably has a sharp leading point.

Figure 6D:
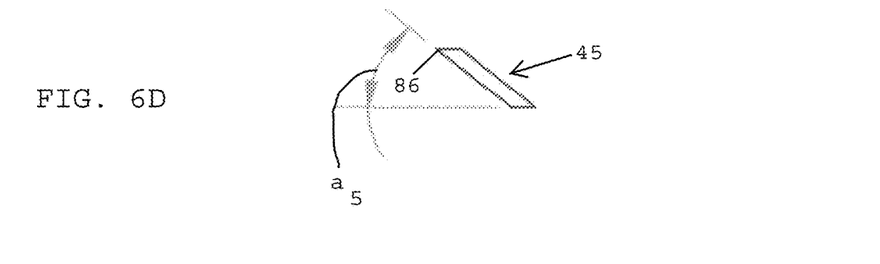

Referring to FIG. 6D, in one embodiment, the scraper 45 is mounted inside the drum region of the drum enclosure 30 (FIG. 2) and preferably angles inwardly toward the screen on the outer surface of the rotating drum at an angle $\alpha 5$ of about 45 degrees. The teeth 86 are preferably positioned adjacent the screen but do not contact the screen so that the rotating drum can rotate without impingement by the teeth 86.

Figure 7A:
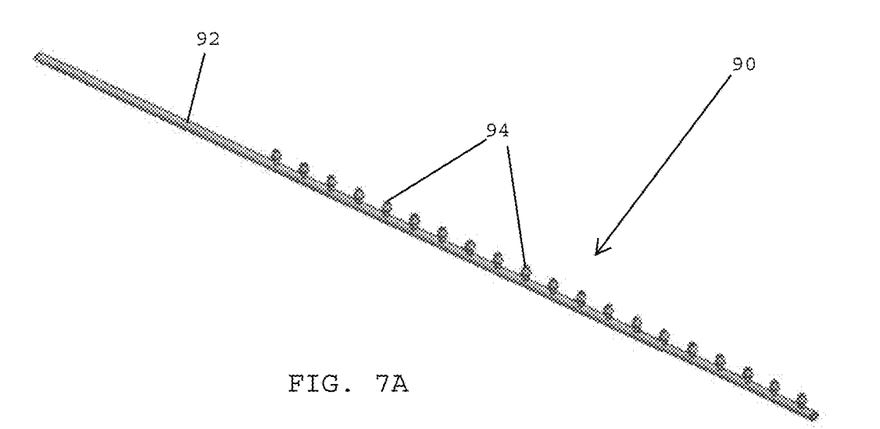
FIGS. 7A-7C show the spray fixture of the particulate recovery system of FIG. 2, in accordance with one embodiment of the present invention.
Figure 7B:
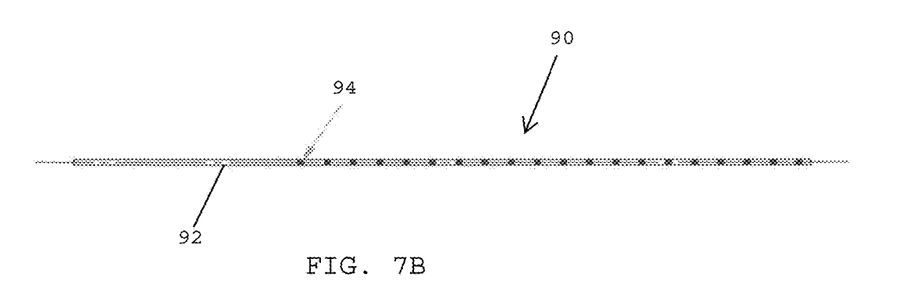
Figure 7C:
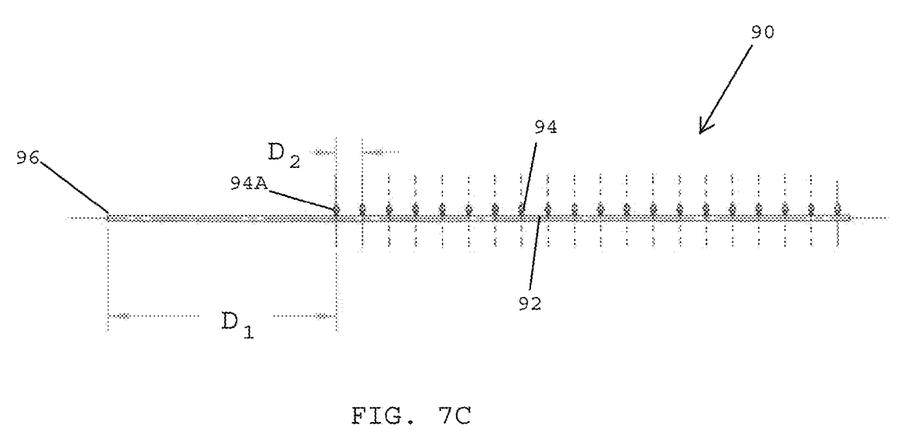

Referring to FIGS. 7A-7C, in one embodiment, the particulate recovery system desirably includes a spray fixture 90 that is disposed inside the rotating drum. The spray fixture is preferably stationary inside the drum and the drum rotates about the stationary spray fixture. In one embodiment, the spray fixture 90 preferably includes a hollow shaft 92 and a plurality of spray nozzles 94 that are spaced from one another along the length of the hollow shaft 92.

Referring to FIG. 7C, in one embodiment, a first spray nozzle 94A is spaced a distance $D_1$ of about 2,438CM from a first end 96 of the hollow shaft 92. The spray nozzles about spaced from one another along the length of the hollow shaft. In one embodiment, the spacing between each spray nozzle 94 defines a distance $D_2$ of about 285 cm.

In one embodiment, the spray fixture 90 is mounted inside the rotating drum so that the nozzles 94 oppose the inner surface of the particulate matter capture screen of the rotating drum. A liquid may be introduced into the hollow shaft 92 and sprayed from the spaced nozzles 94 to dislodge any particulate matter that remains on the outer surface of the screen.

Figure 8:
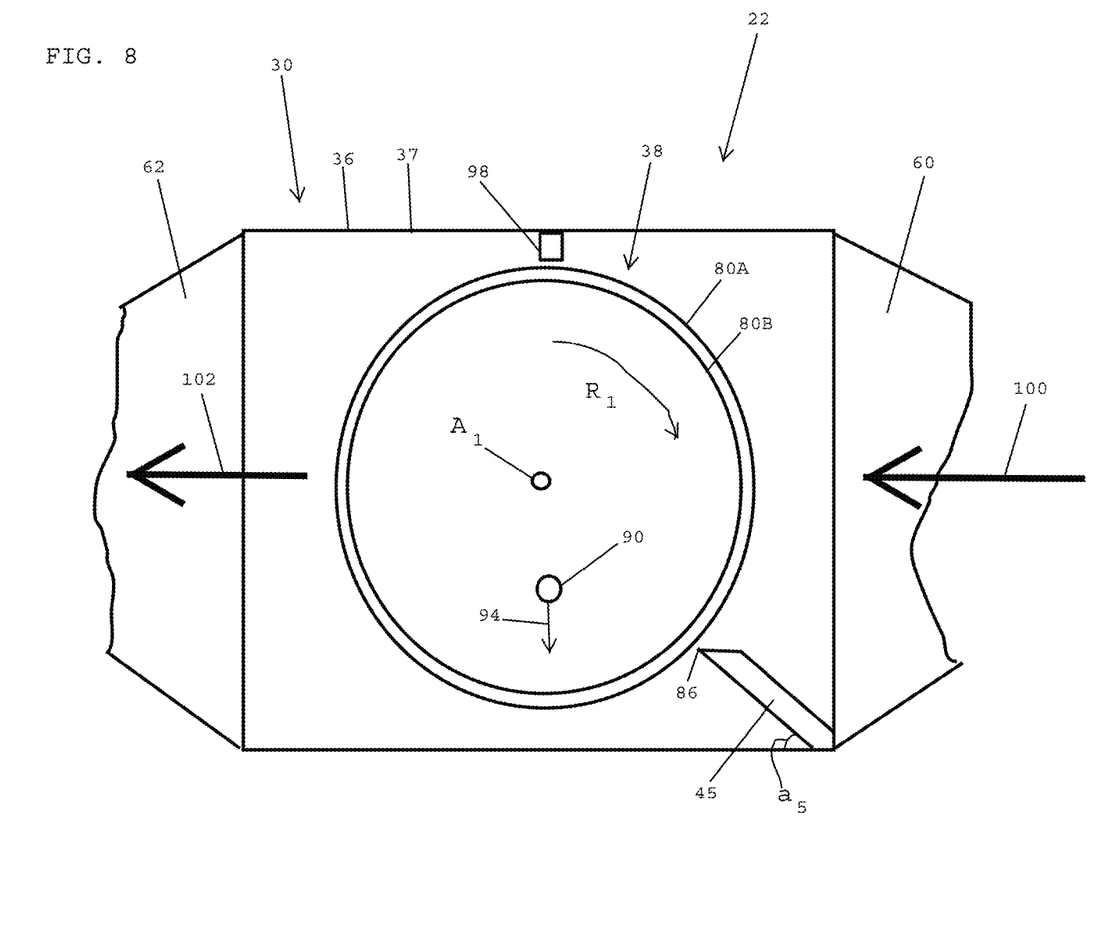
FIG. 8 shows a partial cross-sectional view of the particulate recovery system of FIG. 2 including the drum enclosure, the rotating drum, the particulate scraper, the spray fixture and a stopper, in accordance with one embodiment of the present invention.

Referring to FIG. 8, in one embodiment, the particulate recovery system 22 includes drum enclosure 30 having drum region 36 and rotating drum 38 mounted inside the drum region. The rotating drum 38 rotates about axis $A_1$ in a clockwise direction $R_1$. The particulate recovery system 22 preferably includes scraper 45 having teeth 86 that oppose the outer surface of the screen 80A. The scraper slopes at an angle $\alpha 5$ of about 45 degrees. The unit 22 desirably includes the spray fixture 90 having nozzles 94 that face toward the inner surface of the screen 80B. The unit 22 also desirably includes a stop flange 98 that prevents exhaust gas from flowing between the top of the rotating drum 38 and the roof 37 of the drum region 36.

In operation, dirty exhaust gas 100 enters the leading end of the drum region 36 via the tapered inlet section 60. Upon entering the leading end of the drum region 36, the dirty exhaust gas 100 is intercepted by the rotating drum 38. The particulate matter, such as ash, present in the dirty exhaust gas is captured by the screens 80A,80B. As the drum rotates, the teeth 86 on the scraper 45 remove the collected particulate matter. The removed particulate matter falls to the bottom of the drum region 36 due to gravitational forces. After a section of screen passes the scraper, any particulate matter remaining on the screen is sprayed off the screen by the spray fixture 90 located inside the drum.

In one embodiment, the stop flange 98 restricts the flow of the dirty exhaust gas 100 are directed the dirty exhaust gas to flow through the rotating drum 38.

In one embodiment, as the exhaust gas passes through the screen, the dirty exhaust gas is transformed to clean exhaust gas 102 and discharged from the trailing end of the drum region 36 via the tapered outlet section 62. The clean exhaust gas 102 continues downstream for further treatment to remove other elements such as sulfur, heat and/or carbon dioxide.

The present application discloses various dimensions for the various elements of the system for removing particulate matter from an exhaust gas stream. The dimensions may be modified and still fall within the scope of the invention. The materials used for the various elements may be modified and still fall within the scope of the invention.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A system for removing particulate matter from an exhaust gas stream comprising:
    a housing having an inlet, an outlet, and a drum region located between said inlet and said outlet;
    a drum rotatably mounted in said drum region of said housing and being aligned with said inlet and said outlet for intercepting an exhaust gas stream passing through said housing;
    said drum having a cylindrical shaped screen that allows said exhaust gas stream to pass through said drum while collecting particulate matter present in said exhaust gas stream on an outer surface of said screen;
    a motor for rotating said drum as said exhaust gas stream passes through said housing;
    a scraper adjacent said screen for removing said particulate matter collected on said screen;
    a spray fixture located inside said drum and having spray nozzles that face an inner surface of said screen for spraying fluid at the inner surface of said screen for removing said particulate matter remaining on the outer surface of said screen after the outer surface of said screen has been scraped.

2. The system as claimed in claim 1, further comprising a stop flange extending from a roof of said housing and toward said drum for directing the flow of said exhaust gas stream through said drum so that said exhaust gas stream cannot flow between said drum and said roof of said housing.

3. The system as claimed in claim 1, wherein said drum region of said housing defines the largest cross-sectional area of said housing.

4. The system as claimed in claim 3, wherein said housing tapers outwardly between said inlet and a leading end of said drum region, and said housing tapers inwardly between said trailing end of said drum region and said outlet.

5. The system as claimed in claim 1, wherein said drum region of said housing has a lower end including a tapered lower section that collects said particulate matter scraped off said screen by said scraper and removed from said screen by said spray fixture.

6. The system as claimed in claim 5, further comprising an auger coupled with said tapered lower section of said housing for transporting said separated particulate matter toward a waste receptacle.

7. The system as claimed in claim 1, wherein said drum comprises:
a first end plate having a first shaft;
a second end plate having a second shaft, wherein said first plate opposes said second plate and said first and second shafts are aligned with one another along a common axis;
a plurality of stabilizing rods extending between said first and second plates for interconnecting said first and second plates;
said cylindrical shaped screen wrapped around said stabilizing rods and extending between said first and second end plates.

8. The system as claimed in claim 7, wherein said drum and said cylindrical shaped screen comprise stainless steel.

9. The system as claimed in claim 1, wherein said cylindrical shaped screen comprises an outer screen layer and an inner screen layer.

10. The system as claimed in claim 9, wherein said an outer screen layer has a twild weave and said inner screen layer has a plain weave.

11. The system as claimed in claim 10, wherein said outer screen layer is 250 mesh and said inner screen layer is 250 mesh.

12. A system for removing particulate matter from an exhaust gas stream comprising:
a housing having an inlet for receiving an exhaust gas stream, an outlet for discharging said exhaust gas stream after particulate matter has been removed therefrom, and a drum region located between said inlet and said outlet;
a rotatable drum mounted within said drum region of said housing for intercepting said exhaust gas stream as said exhaust gas stream passes through said housing;
said rotatable drum having a cylindrical shaped screen that allows said exhaust gas stream to pass through said rotatable drum as said rotatable drum rotates, wherein said cylindrical shaped screen blocks and collects said particulate matter present in said exhaust gas stream on an outer surface of said cylindrical shaped screen;
a motor coupled with said rotatable drum for selectively rotating said rotatable drum;
a particulate matter scraper disposed inside said housing and located adjacent the outer surface of said cylindrical shaped screen for removing said particulate matter from said cylindrical shaped screen as said rotatable drum is rotated by said motor;
a spray fixture located inside said rotatable drum and having spray nozzles spaced along the length thereof for dispensing a fluid, wherein said spray nozzles face an inner surface of said cylindrical shaped screen for spraying the fluid at the inner surface of said cylindrical shaped screen for removing said particulate matter remaining on said cylindrical shaped screen.

13. The system as claimed in claim 12, wherein as said exhaust gas stream passes through said cylindrical shaped screen of said rotatable drum, said particulate matter in said exhaust gas stream is collected by said cylindrical shaped screen so that said exhaust gas stream discharged from said outlet has less particulate matter than said exhaust gas stream entering said inlet.

14. The system as claimed in claim 12, further comprising a control system coupled with said motor for controlling the rotation speed of said rotatable drum.

15. The system as claimed in claim 12, further comprising a control system coupled with said spray fixture for controlling the volume of the fluid sprayed by said spray fixture.

16. The system as claimed in claim 12, wherein said drum comprises:
a first end plate having a first shaft;
a second end plate having a second shaft, wherein said first plate opposes said second plate and said first and second shafts are aligned with one another along a common axis;
a plurality of stabilizing rods extending between said first and second plates for interconnecting said first and second plates;
said cylindrical shaped screen wrapped around said stabilizing rods and extending between said first and second end plates.

17. A method of removing particulate matter from an exhaust gas stream comprising:
providing a housing having an inlet, an outlet, and a drum region located between said inlet and said outlet;
mounting a drum within said drum region of said housing, said drum having a screen adapted to collect particulate matter present in said exhaust gas stream;
while rotating said drum, directing said exhaust gas stream into said inlet so that said exhaust gas stream passes through said screen and said drum;
collecting said particulate matter in said exhaust gas stream on an outer surface of said screen;
scraping said collected particulate matter from the outer surface of said screen;
after scraping, spraying fluid at an inner surface of said screen to dislodge any of said particulate matter remaining on said screen.

18. The method as claimed in claim 17, further comprising transporting said scraped and dislodged particulate matter to a waste receptacle.

19. The method as claimed in claim 17, wherein said screen is a cylindrical shaped screen having an outer screen layer and an inner screen layer.

20. The method as claimed in claim 17, wherein said scraping step comprises providing a particulate matter scraper inside said housing for engaging said particulate matter collected on the outer surface of said screen, and wherein said spraying fluid step comprises spaying water under high pressure at the inner surface of said screen to dislodge said particulate matter remaining on said outer surface of said screen after the scraping step.

* * * * *